US005143576A

United States Patent [19]

Logan

[11] Patent Number: 5,143,576

[45] Date of Patent: Sep. 1, 1992

[54] AUTOMATIC WEEDING SYSTEM AND METHOD OF USE

[75] Inventor: David J. Logan, Bloomfield, Conn.

[73] Assignee: Gerber Scientific Products, Inc., Manchester, Conn.

[21] Appl. No.: 566,123

[22] Filed: Aug. 10, 1990

[51] Int. Cl.$^5$ .............................................. B32B 31/00

[52] U.S. Cl. .................................... 156/353; 156/250; 156/268

[58] Field of Search ............... 156/250, 251, 257, 260, 156/267, 268, 269, 290, 265, 351, 353, 344

[56] References Cited

U.S. PATENT DOCUMENTS

| | | | |
|---|---|---|---|
| 2,907,682 | 10/1959 | Eichel | 33/18 R |
| 3,785,898 | 1/1974 | Gerber et al. | 156/353 |
| 4,444,078 | 4/1984 | Pearl | 83/374 |
| 4,467,525 | 8/1984 | Logan et al. | 33/18 R |
| 4,512,839 | 4/1985 | Gerber | 156/268 |
| 4,732,069 | 3/1988 | Wood et al. | 83/881 |
| 5,026,584 | 6/1991 | Logan | 428/40 |

*Primary Examiner*—David A. Simmons
*Assistant Examiner*—Robert Barker
*Attorney, Agent, or Firm*—McCormick, Paulding & Huber

[57] ABSTRACT

A system automatically weeds around graphics cut into a sheet of sign material having a backing and utilizes a tool moved relative to the sign material sheet along a path offset from the lines of cut defining the graphic in response to commands issued by a controller to selectively bond an overlay sheet to the weed portions of the sign material sheet. The overlay sheet is placed over the sign material sheet and is selectively bonded with portions of the cut sign material sheet for subsequent separation of the nongraphic or weed material from the cut graphic when the overlay sheet is pulled away from the backing.

19 Claims, 8 Drawing Sheets

AUTOMATIC WEEDING SYSTEM AND METHOD OF USE

CROSS REFERENCE TO RELATED APPLICATIONS

The present invention relates to copending U.S. Ser. No. 056,458, entitled SIGN MAKING WEB WITH DRY ADHESIVE LAYER AND METHOD OF USING THE SAME filed on May 29, 1987 in the name of the same inventor of the present invention and being commonly assigned therewith.

BACKGROUND OF THE INVENTION

The present invention resides in a system wherein graphics are automatically cut into a sheet of sign material continuously fed through an automated cutting apparatus and more particularly resides in a means and method provided in the system by which the cut sign material sheet is automatically weeded such that portions of the sign material sheet not comprising the cut graphic may be readily peeled away from graphic thus avoiding the practice of hand weeding.

Creating graphics in a web of sign material by cutting into it letters or other shapes has been significantly aided by automated sign generating systems such as disclosed in U.S. Pat. No. 4,467,525 issued to Logan et. al on Aug. 28, 1984, which patent being commonly assigned with the assignee of the present invention. These automated sign making machines permit the rapid composition of sign characters and logos in a variety of fonts, character sizes, spacing, arrangements and appearances selected by the user according to the desired message to be made. Additionally, these machines recall from memory preprogrammed designs directing movements of an automated coordinate controlled cutting tool over the sign material sheet to effect rapid cutting of the desired graphic into the sign material sheet. The designs and letters which comprise the graphic cut into the sign material sheet are not strictly closed shapes, such as found with the letters "J" or "L", but rather involve shapes that have openings cut in them to further define the character or shape being created, such as with the letters "O" or "P". Thus, it becomes apparent that despite the rapidity which these shapes can be cut by the machine in the sign material sheet, mass producing these shapes in final form is nonetheless limited by the hand weeding process.

Hitherto, weeding of sign material from around and within the graphic cut in the sign material sheet was usually done by hand utilizing a pair of tweezers to lift an edge of the material away from a base or liner sheet material on which the sign material sheet is carried. Since the sign material sheet and the base layer are loosely bonded with one another by a layer of low tack adhesive, the process of hand weeding can become particularly tedious especially in light of the very thin sign material sheet thickness which must be separated from the associated base layer. Notwithstanding this, weeding of the unwanted sign material from the cut graphic while the graphic is still bonded to the base layer sheet is necessary in order to allow the component parts of the graphic to be maintained in the same spatial relationship with which they were originally cut. Since the variously different sized and shaped pieces which may comprise a particular graphic are precisely arranged by the machine according to a computerized program, it is important that the original layout of the graphic is not disrupted so that it may subsequently be directly applied to the sign surface in the same spatial relationship in which it was produced by the machine.

It is therefore an object of the present invention to provide an automated weeding system of the type wherein a graphic is automatically cut in a sheet of sign material such that sign material not included as part of the cut graphic is automatically weeded from the underlying base layer thus avoiding manual weeding of the sheet material from in and around the cut graphic.

It is a further object of the present invention to provide an automatic weeding system of the aforementioned type wherein differently sized and shaped graphics may be cut from a sheet of sign material and subsequently automatically weeded regardless of the variations in character shapes or patterns cut into the web.

It is yet a further object of the present invention to provide an automatic weeding system of the aforementioned type wherein the sheet of sign material comprising the cut graphic remains bonded to a base sheet in the same orientation and arrangement as originally cut by the system such that the unwanted sign material is readily removed from within and around the cut graphic by an overlay sheet automatically bonded to the weed portions of the sign material sheet.

A further object of the present invention is to provide a method for automatically weeding portions of the sheet of sign material from the underlying base layer upon which the sign material sheet is bonded by utilizing the vectors responsible for originally cutting the graphic to selectively bond unwanted portions of the sign material sheet with an overlay sheet for subsequent removal of the weed.

Still a further object of the present invention is to provide a method whereby differently sized and shaped graphics formed in the sheet material may be left on the underlying base layer while the remaining non-graphic material is pulled away from the underlying base layer by an overlay sheet provided with means for separating graphic and non-graphic material from the base layer.

Other objects an advantages of the present invention will be apparent from the following description and the drawings and from the appended claims.

SUMMARY OF THE INVENTION

The present invention resides in an automatic weeding system and method wherein a web of sheet material fed into a sign generating machine generating sign text in the form of a graphic or logo is subsequently worked on by the machine to bond portions of the sheet material not otherwise comprising the graphic to an overlay sheet thus effecting automatic weeding around the cut graphic for subsequent application onto a sign surface.

For this, the apparatus includes a support surface for supporting the sheet material during a cutting operation and includes advancing means having two spaced apart sprockets with associated clamps for advancing or feeding the sheet material across the support surface. The advancing means is capable of receiving in registry therewith the sign material sheet on which is formed the generated sign text and the overlay sheet placed in confrontation with the upper surface of the sheet material during the weeding operation such that the two layers move in registry with one another through the machine. Means are provided for suspending a tool means for movement over the support surface upon which surface the sheet material is moved in coordinated movements with the movements of the tool means. The tool means is comprised of both a cutting implement for cutting the sign material sheet to generate the desired graphic and a tool movable over the support surface for selectively bonding the overlay sheet to the non-graphic areas placed in confrontation with it. The tool means may also comprise a tool assembly having both a cutting tool with a depending tip defining a penetrable depth and an offset pressure foot, the thickness of the overlay sheet being selected such that it is substantially greater than the penetration depth of the cutting tool.

The sign material sheet is a web of soft cuttable plastic or like material having an upper surface facing upwardly toward the tool means and having its opposite lower surface facing a base or liner sheet, with the sign material sheet lower surface and the base sheet upper surface being releasably attached with one another by a layer of permanently tacky adhesive. In one embodiment of the invention, the upper surface of the sign material sheet comprises the good or sign surface and the layer of permanently tacky adhesive is bonded more strongly to the lower surface of the sign material sheet than to the upper surface of the liner material sheet. With this arrangement, a bonding material capable of being activated by the tool means is formed on the lower surface of the overlay sheet and is selectively activated to bond the overlay sheet with the non-graphic portions of the sign material sheet when it is placed in confrontation with the sign material sheet and subsequently acted on by the tool means. The bonding material here is comprised of microencapsulated adhesive activated into a tacky condition by the application of downward pressure on the upper surface of the overlay sheet. Alternatively, the bonding material may take the form of a dry activatable adhesive layer formed on the upper surface of the sign material sheet having an opposite lower surface defining the sign surface releasably attached to the base layer by a pressure sensitive or permanent tacky layer of adhesive. Since the sign material sheet here carries the adhesive necessary for weeding the non-graphic portions of the sign material sheet, the overlay sheet is thus comprised of a single sheet having no adhesive. The dry activatable adhesive may be chemically activated and subsequently bonded with the overlay sheet after a chemical activator is applied to the upper surface of the overlay sheet.

For moving the tool means along a path over the bonding means to effect selective activation of it, the controller utilizes memory means to cause the tool which activates the bonding means to move it along a path just slightly offset from the cut lines defining the graphic. For this purpose, the machine stores vectors and data defining font characters in terms of strokes in the memory means to subsequently move the tool along the offset path. The adhesive strength of the activated bonding material interposed between overlay sheet and the sign material sheet is substantially greater than that of the layer of permanently tacky adhesive interposed between the sheet of base material and the sign material sheet such that the non-graphic portions of the sign material sheet are capable of being lifted off the liner with the overlay sheet when the overlay sheet is pulled away from it.

The method of automatically weeding sign material in and around a graphic cut in a web of sign material comprises in the preferred embodiment, providing a sign material sheet having an upper surface and an opposite lower surface with the lower surface of the sign material sheet being releasably attached to a base sheet by a layer of low tack adhesive. Lines are cut in the sign material sheet to create a graphic. An overlay sheet is provided having an upper surface and an opposite lower surface for selectively attaching and pulling away non-graphic portions of the sign material sheet. Bonding material capable of being activated in part from an inert state to a tacky activated state are provided. The overlay sheet is placed on the sign material sheet so that the overlay sheet becomes bonded to the non-graphic portions of the sign material sheet. Subsequently, the overlay sheet and the sign material sheet are pulled from the base sheet to remove the weed portions of the sign material sheet surrounding the cut graphic.

DETAILED DESCRIPTION OF THE PREFERRED EMBODIMENTS

Figure 1:
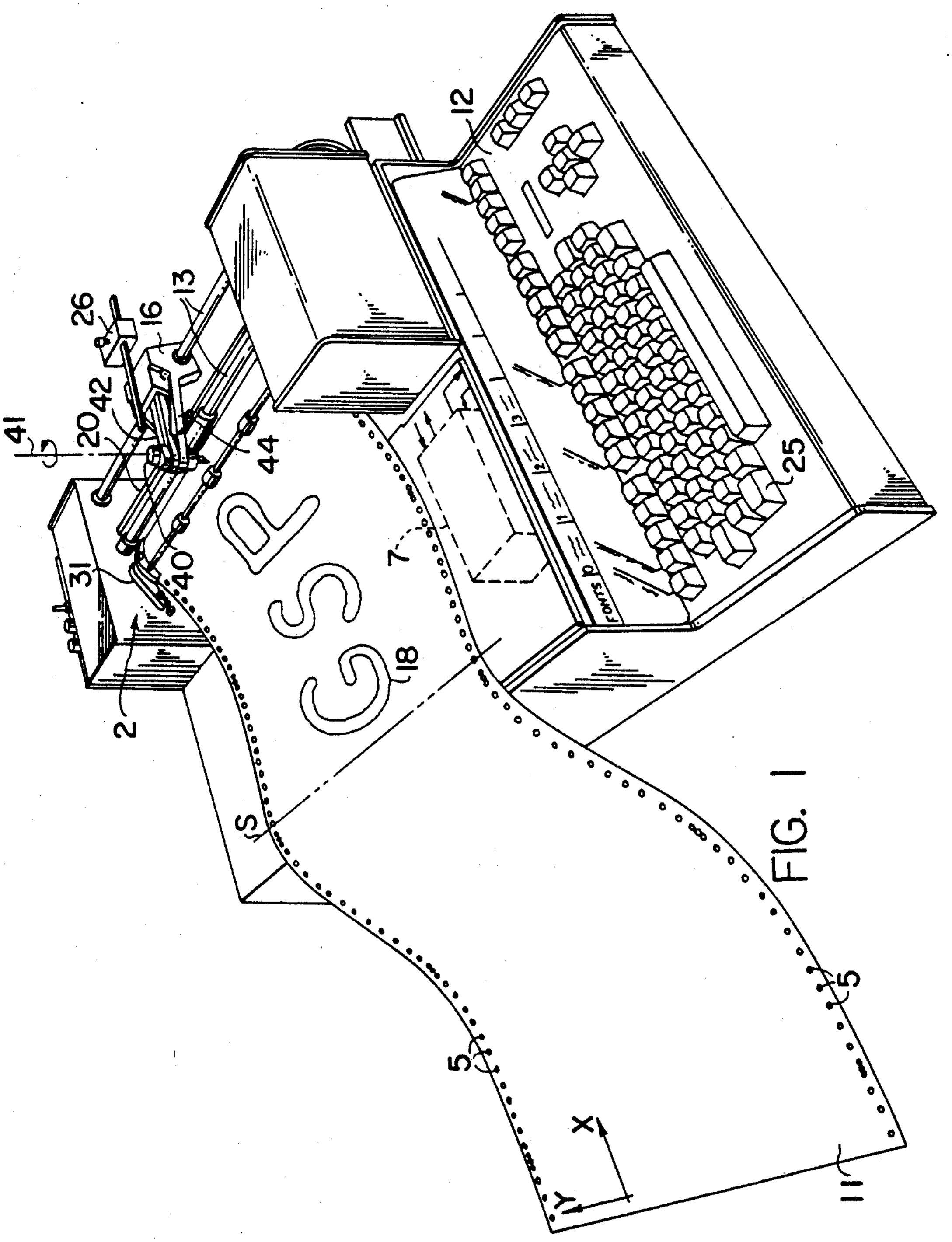
FIG. 1 is a perspective view illustrating the sign generating apparatus employed by the present invention.

Referring now to FIG. 1, a sign making machine 12 is illustrated for handling and working on an associated web 11 of laminated sheet material. The web 11 is moved through the machine 12 longitudinally of itself in the illustrated X coordinate direction by material advancing or feeding means 2 across a work surface defined by a roller 20. A tool head is supported and driven by appropriate motor means (not shown) in the illustrated Y coordinate direction on a way 13 extending transversely relative to the web 11. The machine 12 further includes a controller 7 having a microprocessing unit linked to a memory means and a keypad interface 25 for instructing the controller 7 to move the web 11 relative to the tool head 16 to cause a graphic 18 to be formed in the web 11.

Figure 2:
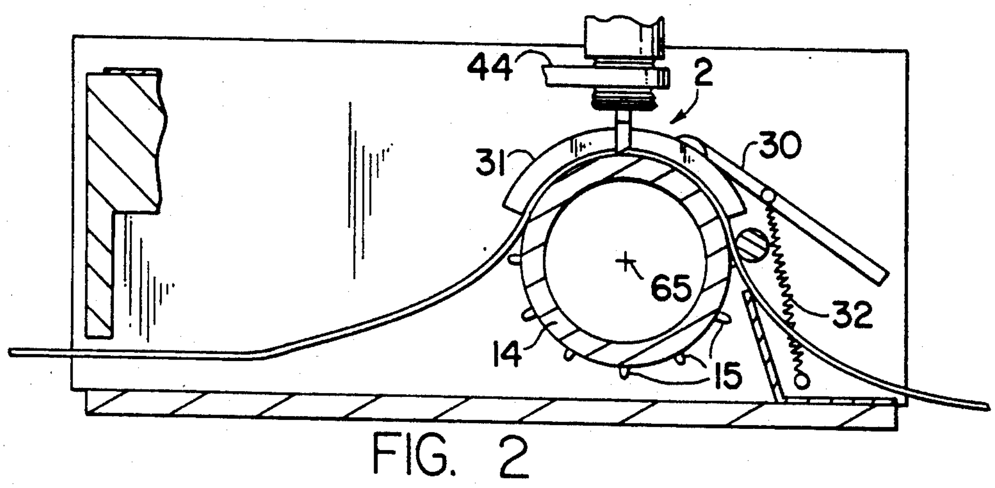
FIG. 2 is a cross sectional view showing the tool head and the material advancing mechanism employed in the apparatus of FIG. 1.

Referring now to FIG. 2 and in particular to the advancing means 2 used for controlled movement of sections of sheet material through the machine 12, it will be seen that the advancing means includes two sprockets 14,14 rotatably driven by appropriate motor means about a common axis of rotation 65 in response to instructions issued by the controller 7. The sprockets 14,14 are spaced apart from one another by approximately the width of the web 11 and have a series of circumferentially disposed teeth or pins 15,15 projecting radially outwardly from the axis 65. The pins 15,15 are received within a series of openings 5,5 extending along either side edge of the web 11 in order to effect positive movement of the web 11 through the machine 12. Each of the sprockets has an associated arcuate clamp 31 joined with a pivotal support arm 30 biased toward the sprocket by a spring 32 drawing the clamp against the sheet material being pulled through the machine 12. The arcuately shaped guide clamps 31,31 each have an arcuate groove straddling the sprocket pins allowing the pins 15,15 to rotate through the clamps while nevertheless allowing each clamp to apply the hold down force necessary to keep the sheet material in registration with the sprockets.

The tool head 16 carries a tool holder 40 and an associated tool rotatable relative to the head about an axis 41 oriented substantially vertically when the tool head is in the working position above the web 11 as illustrated in FIG. 1. To effect rotation of the tool holder 40 about the axis 41, a drive belt 42 is employed to rotatably couple the tool holder 40 to a motor carried by the tool head 16 responsive to commands issued by the controller 7. The tool head is pivotally mounted on the carriage 13 such that the tool holder 40 is cantilevered outwardly therefrom by an arm 44 allowing the holder and its associated tool to be normally urged downwardly toward the web 11 by gravity. For adjusting the amount of downward force, a counterweight 26 is provided for varying the amount of downward pressure applied to the sheet material passing beneath the tool holder.

Figure 3:
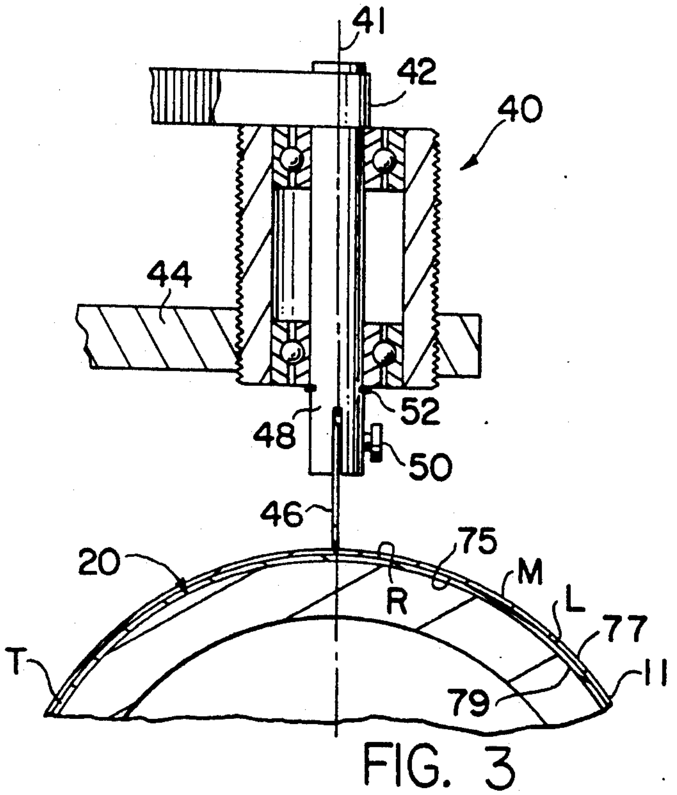
FIG. 3 is a side elevation view partially in section showing a knife blade tool and its associated support arm shown in FIG. 2.

As can be seen from the illustrative example in FIG. 3, the tool holder 40 has a chuck 48 for holding a cutting tool 46 for movement above the web 11 at the apex of the roller 20. In this illustrative example, the cutting tool 46 is a small scapula blade having a sharp cutting edge at its depending end and is clamped to the chuck 48 by means of a clamping screw 50 at its generally flat upper end. The chuck 48 and the associated cutting tool 46 are prevented from moving axially upwardly relative to the arm 44 by a detent ring 52 received within a circumaxial groove formed in the chuck 48. In the illustrated example of FIG. 3, the chuck 48 is shown rotatably coupled by the belt 42, but may alternatively be freely rotatable about the tool axis 41 such that it is capable of repositioning itself along a line of cut as the directional movement of the web 11 is changed.

As will be discussed in greater detail later with reference to table A-1 below, the web 11 may be comprised of a sheet of sign material M and an underlying liner or bass sheet L adhered to it. Each sheet has a relative thickness such that the materials allow the blade 46, with the appropriate adjustment of the counterweight 26, to cut the sheet material M while nevertheless only slightly scoring the liner L. To this end, the sign material sheet M has a cuttable upper sign surface 77 facing the tool head 16 and has an opposite lower surface 75 facing the liner sheet material L. The liner sheet material has an upper release surface R and an opposite lower surface 79 supportedly engaged by the roller 20. Interposed between the sign material sheet M and the liner sheet material L is a layer T of pressure sensitive adhesive or permanently tacky adhesive releasably adhered to the release surface R of the liner sheet L, yet more strongly bonded to the lower surface 75 of the sign material sheet M. The adhesive layer T is however sufficiently strong enough to bond the cut graphic to a substrate surface in a manner consistent with that disclosed in the aforementioned U.S. Pat. No. 4,467,525 issued to Logan et al.

Figure 4:
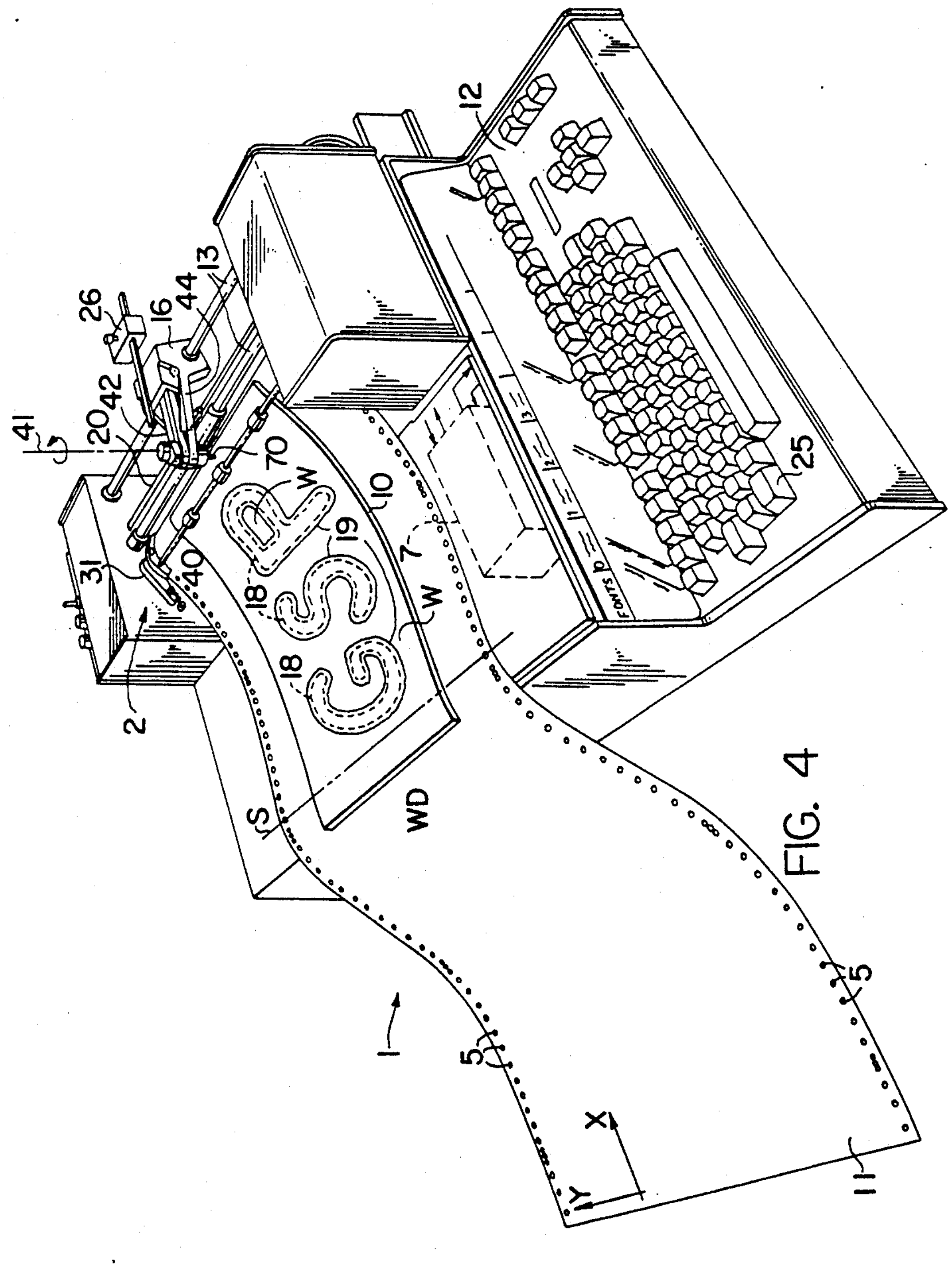
FIG. 4 is a perspective view illustrating the automatic weeding system embodying the present invention.

In accordance with the invention, an automated weeding system indicated generally as 1 in FIG. 4 is employed for readily removing weed portions W of the sign material sheet M from around and within the graphic 18 cut in it. The system 1 includes the aforementioned machine 12 which initially cuts the graphic 18 into the web 11, an overlay sheet 10 having means for placing it in registration with the cut web 11, a means 70 carried by the tool holder 40 for selectively bonding the overlay sheet 10 with portions of the sheet material M and a means within the controller 7 for causing the means 70 to follow a path slightly offset from the cut lines defining the graphic 18.

Figure 5:
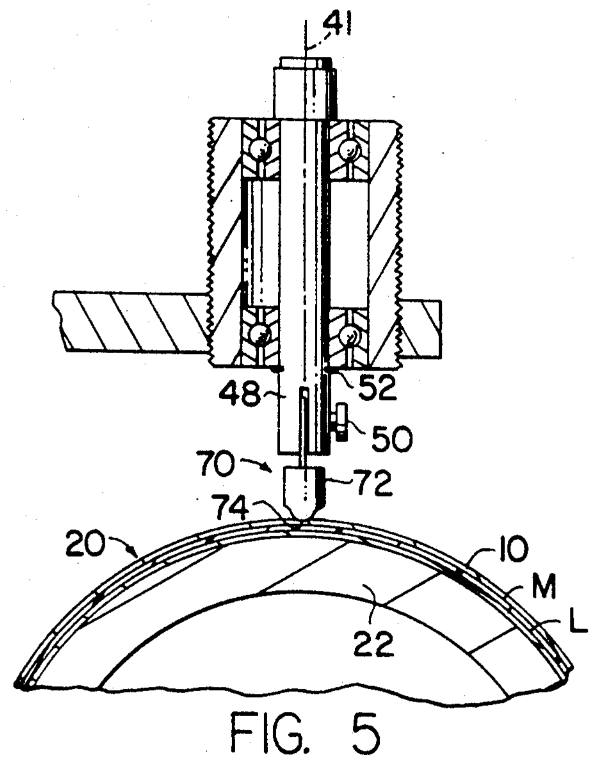
FIG. 5 is a side elevation view partially in section showing a pressure tool mounted in the support arm in place of the cutting tool of FIG. 3.
Figure 6:
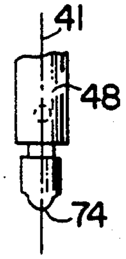
FIG. 6 is a fragmentary side elevation view of the pressure tool of FIG. 5 shown from another side.

In one embodiment of the invention, as shown in detail in FIGS. 5 and 6, the means 70 includes a pressing tool 72 having a depending tip 74 for engaging with the overlay sheet 10 to press it into bonding relationship with the underlying sign material sheet M in a manner that will be hereinafter become apparent. The pressing tool 72 at its upper end is sized to be received within the chuck 48 and may readily replace the cutting tool 46 by loosening the clamping screw 50 and reinserting the pressing tool 72 in its place.

Figure 7:
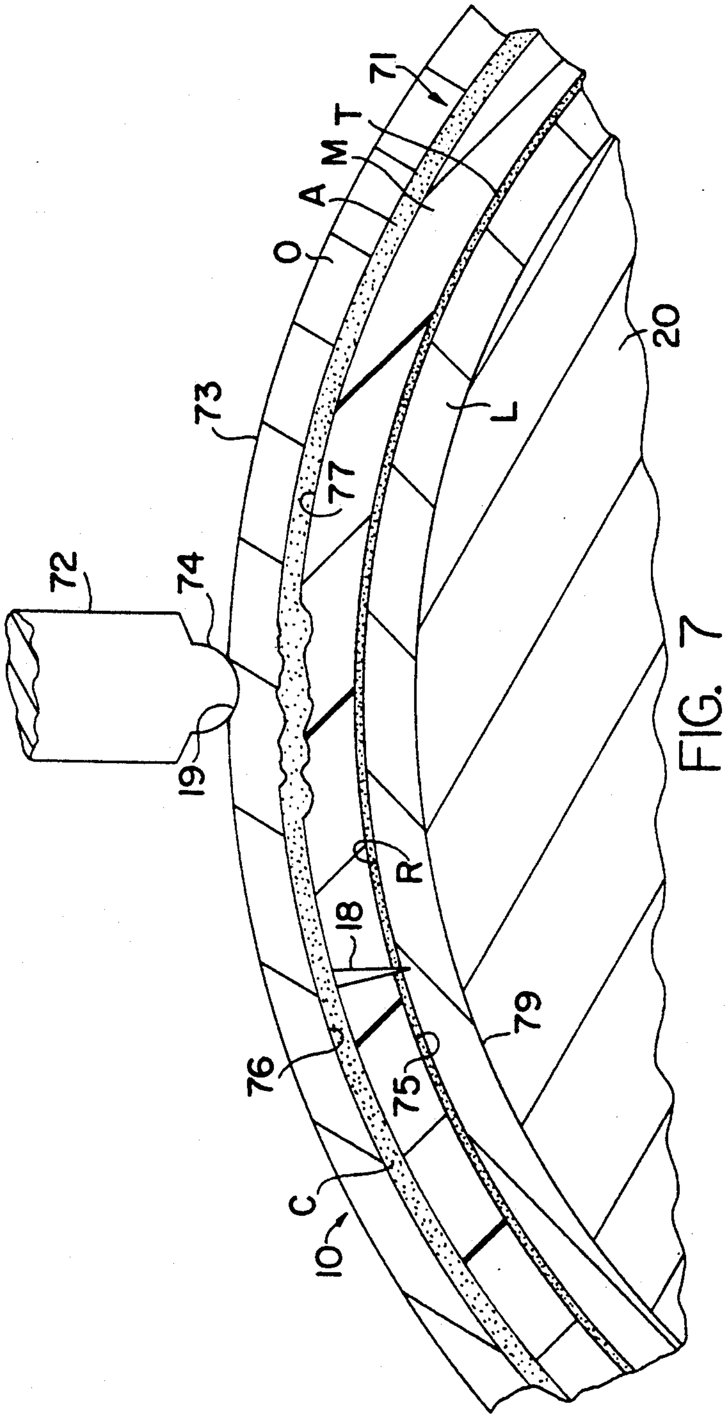
FIG. 7 shows in side elevation view a pressing tool in contact with the overlay sheet and the sign web being supported on a fragmentary vertical section view of the support roller.

Interposed between the overlay sheet 10 and the web 11 is a bonding material 71 for selectively bonding to the overlay sheet 10 portions of the sign material sheet M directly underlying the tip 74 of the pressure tool 72. For this purpose, the overlay sheet 10 as illustrated in FIG. 7 may be comprised of a backing material O, preferably inexpensive paper having an upper surface 73 facing the tool 72 and an opposite lower surface 76 having a tacky adhesive layer A bonded to it. The adhesive layer A is a generally low tack adhesive with enough strength to hold the backing material O in place on the sign material sheet M. Here it should be understood that the adhesive layer A allows overlay sheet 10 to be held in registration with the web once it is placed onto the web for unitary movement therewith through the machine 12 as will hereinafter become apparent. Embedded within the adhesive layer A however are a plurality of hollow microspheres C, within each is encapsulated a much stronger adhesive. Alternatively, each microsphere could contain a catalyst for activating the otherwise low tack adhesive layer A into an enhanced holding adhesive. In the preferred embodiment of the invention however, the microspheres C contain a separate stronger adhesive and are of the type commercially available through the 3M Corporation having an 80% total weight payload fill of adhesive and a 20% total weight content comprised of shell.

The microspheres C are particularly well adapted for the purpose of automatic weeding because the microspheres C are crushable under the pressure tool 72 to effect enhanced bonding between the sheets O and M in regions exclusively beneath the tip 74 as can be appreciated from FIG. 7. The relative adhesive bonding strengths and material thicknesses involved are selected such that the graphic 18 will remain adhered to the liner L while the weed portions W comprising the remaining sign material sheet M are pulled away with the overlay sheet 10 as will be discussed in greater detail with reference to FIG. 9. The following table lists for purposes of illustration, characteristics of exemplary material types capable of carrying out the method associated with the automated system 1 embodying the present invention.

TABLE A-1

| SHEET MATERIAL CHARACTERISTICS | | |
|---|---|---|
| ELEMENT | THICKNESS (INCHES) | MATERIAL |
| M | 0.003-0.004 | Soft polyvinyl-chloride |
| L | 0.012-0.015 | 90 pound paper |
| O | 0.007-0.008 | 60 pound paper |

| ADHESIVE CHARACTERISTICS | | |
|---|---|---|
| ELEMENT | MATERIAL | PEEL STRENGTH GRAMS/IN |
| T | Rubber based permanent tacky or pressure sensitive | 40-50 |
| C | Microcapsules 15-120 microns | 400-500 |
| A | Rubber based permanently tacky or pressure sensitive | 15-20 |

Figure 8:
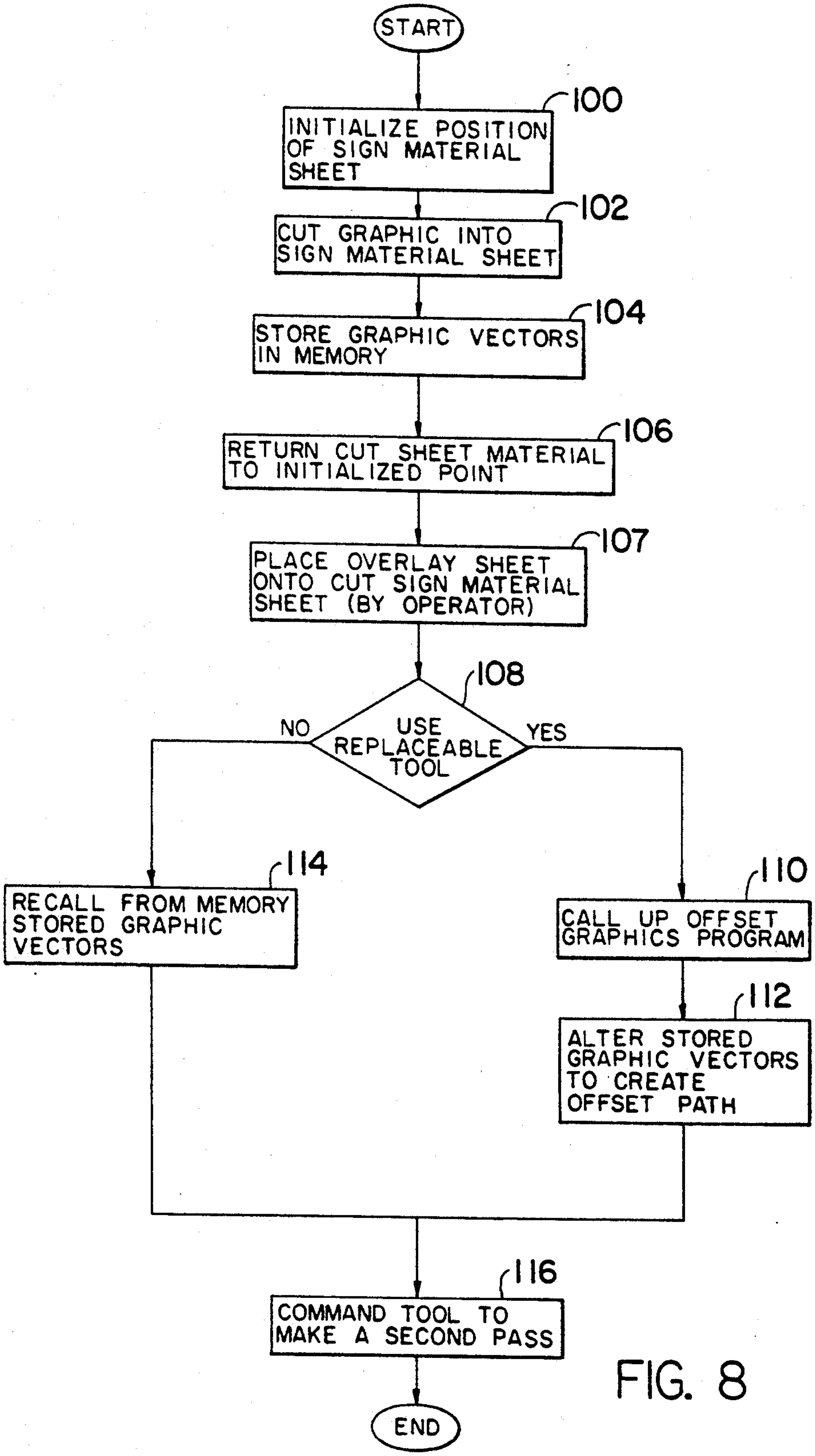
FIG. 8 is a flowchart of the program followed by the controller for accomplishing the weeding process.

Referring now to FIG. 8 and to the manner in which the automatic weeding system 1 operates, it should be seen that the controller 7 determines a point along the length of the web 11, illustrated as position S in FIG. 4, for the purpose of moving the web in either direction relative to it. Here the point S coincides with the place where the cutting tool begins cutting the graphic 18 into the web 11 (step 100). In so doing, the cutting tool 46 is made to follow a preprogrammed first path along the web 11 to cut the graphic 18 into the sign material sheet M (step 102) in the manner discussed previously with reference to FIG. 1. The vectors used in creating the involved graphic 18 are stored in memory (step 104) for later use. Once the graphic is cut, the controller 7 then instructs the material advancing means 2 to reverse the direction of the web 11 to position the initialization point S in registry with the cutting tool 46 (step 106). While maintaining registration of the web 11 with the sprockets 14,14, the overlay sheet 10 is placed down on the sign material sheet M (step 107) such that it completely covers the graphic 18 cut into the sign material sheet M. Since the overlay sheet width WD is shorter than that of the web 11, by for example approximately 2 inches, it does not interfere with the advancing means sprockets 31,31 thus allowing the adhesive layer A to maintain both the web 11 and the overlay sheet 10 in registration with one another for unitary movement through the machine 12.

With the overlay sheet 10 now in place and the pressure tool 72 substituted for the cutting tool 46, the controller 7 causes the pressure tool 72 to follow a second path 19 along the upper surface 73 of the sheet O slightly offset from the cut lines defining the pattern 18 made in the web 11 as shown in phantom line in FIG. 4. For this purpose, the controller 7 recalls from memory, a standard offset software program (step 110) and uses it to alter the basic vectors from which the graphic 18 was originally cut (step 112) thereby causing the tool 72 to be moved along the second path 19. Where letters or other shapes having openings are involved, such as in the case with the letters "P" and "O", the tool 72 follows a path just slightly inwardly offset from the interior perimeter defining the opening. Otherwise, the pressure tool 72 is moved about the outer perimeter of the graphic 18 outwardly offset from the cut lines defining the graphic 18. In so doing, the tool 72 crushes selected ones of the underlying microcapsules C embedded in the adhesive layer A during its second pass over the web 11 (step 116) thus bonding the overlay sheet 10 to the weed portions W of the sign material sheet M in the region B just below the path 19 as best illustrated in FIG. 7.

Figure 9:
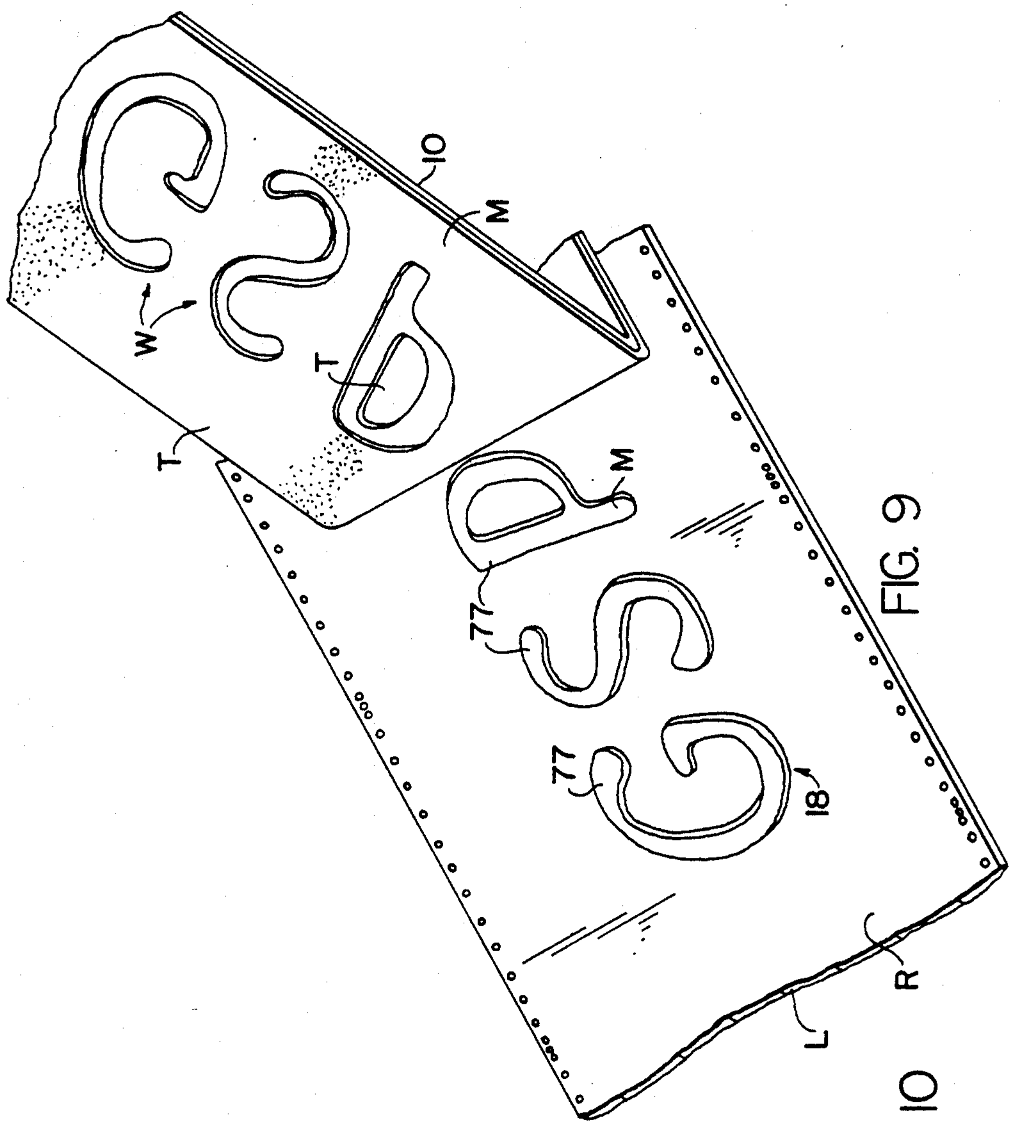
FIG. 9 is a view showing the automatic weeding of the sheet of sign material by the overlay sheet once bonded to it.

Referring now to FIG. 9 and to the final step in the automated weeding process, it should be seen that once the overlay sheet 10 becomes bonded to weed portions W of the sign material sheet M by the activated microcapsules C, automatic weeding of the graphic 18 from the sheet material can now be accomplished. As illustrated here, by pulling the overlay sheet 10 away from the liner sheet material L, the greater adhesive strength of the activated microcapsules C pulls the weed portions W of the underlying material layer M away with it against the less resistant pull strength of the permanently tacky adhesive T.

Figure 10:
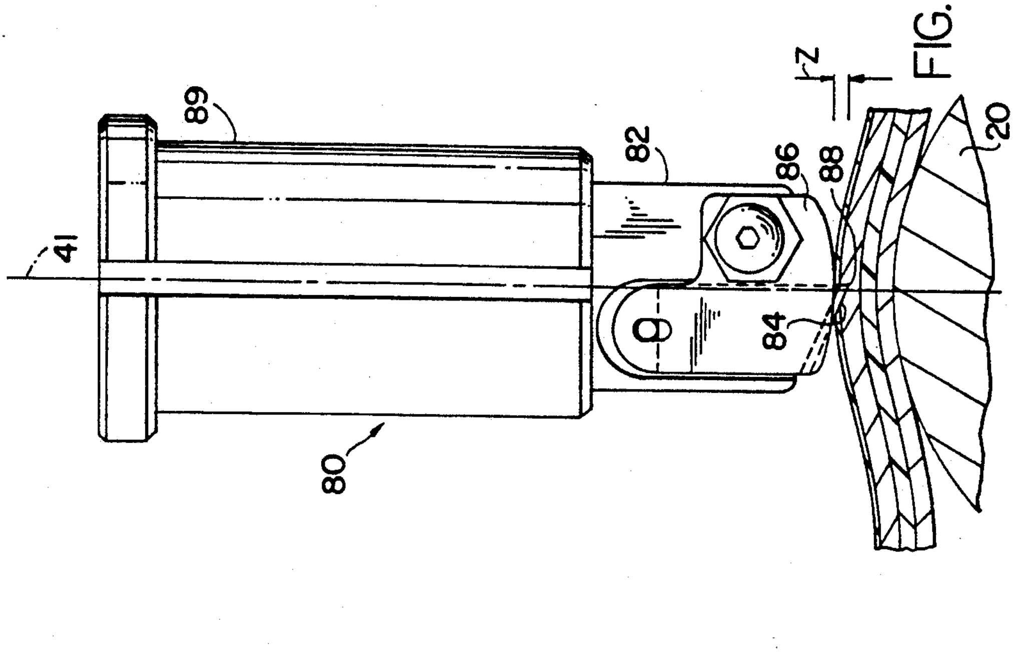
FIG. 10 is an alternative embodiment showing in side elevation view a knife and knife holder assembly including a fragmentary vertical section view of the material being bonded on the support roller.

FIG. 10 shows an alternative embodiment of the cutting tool which may be employed by the weeding system 1. Here, a combination pressure foot and knife holder assembly illustrated generally as 80 is used in place of the tool 72 thus avoiding the need to substitute the pressure tool 72 for the cutting implement 46. The assembly 80 is one such as disclosed in U.S. Pat. No. 4,732,069 issued to Wood et al. on Mar. 22, 1988 which patent being commonly assigned with the assignee of the present invention. As will be discussed in greater detail with reference to FIGS. 11*a*, 11*b*, the tool assembly 80 allows the graphic vectors stored in memory at step 104 to be recalled and used without alteration (step 114) to retrace the graphic 18 on the overlay sheet 10 thus mechanically creating the offset path 19.

The assembly 80 comprises a body portion 89 having a depending portion 82 carrying a knife 84 and a pressure foot 86 offset laterally relative to the knife 84. The tip 88 of the knife projects downwardly from the pressure foot 86 by approximately 0.004 to 0.005 inch as indicated by the dimension Z. Because the tip 88 of the knife does not penetrate through or even substantially through the overlay sheet 10, the pressure foot 86 can thus be used to activate the underlying microcapsules C without causing the sheet O to be unduly cut up as the tool assembly 80 makes its second pass (step 116).

Figure 11A:
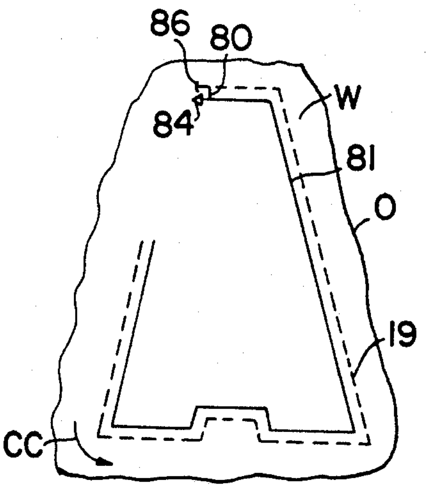
FIGS. 11*a* and 11*b* illustrate the orientation of the pressure foot relative to the knife during the second pass made by the assembly of FIG. 10.
Figure 11B:
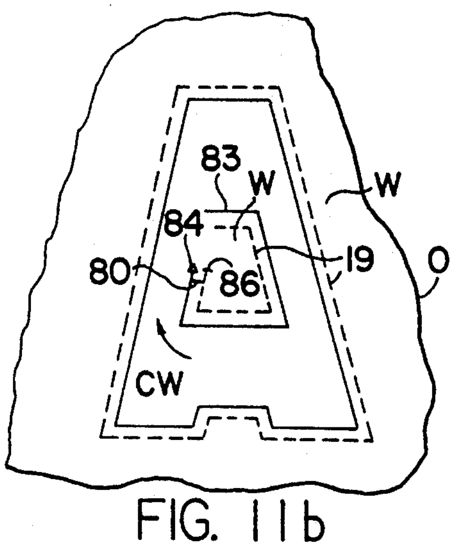

In FIGS. 11*a* and 11*b*, the presser foot 86 and the knife 84 are shown schematically as they are arranged on the tool assembly 80 in order to illustrate the positional relationship between these elements as the assembly 80 retraces the graphic 18 onto the overlay sheet O (step 116). As is shown in FIG. 11*a*, when tracing the outer perimeter of a shape, the assembly 80 is moved along a path 81 in a counterclockwise direction CC directly over the outer cut lines defining the graphic 18 such that the pressure foot 86 tracks along the outside edge of the shape. Conversely, as illustrated in FIG. 11*b*, when the tool 80 traces openings in closed shapes, such as in the case with the letter "O", it is moved in a clockwise direction CW along a path 83 directly above the cut lines defining the opening. This results in the pressure foot 86 being maintained inwardly of the path 83 thus activating the microcapsules C within the weed portion W defining the involved opening.

Figure 12:
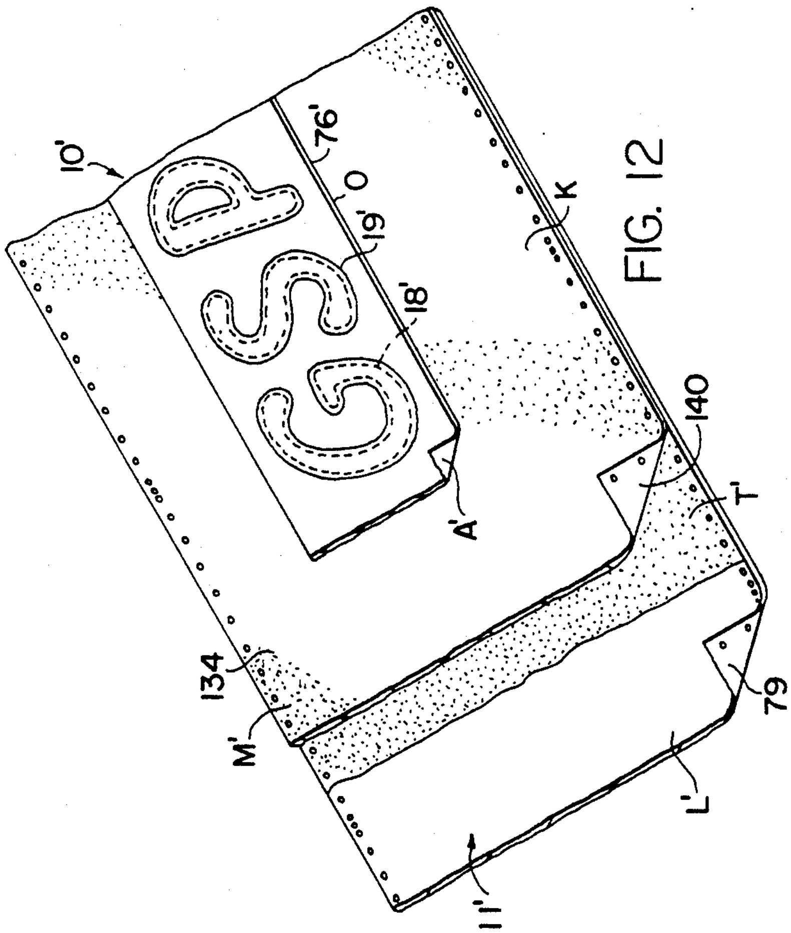
FIG. 12 is an alternative embodiment of the web of sign material in this case having the bonding material formed on its upper surface.
Figure 13:
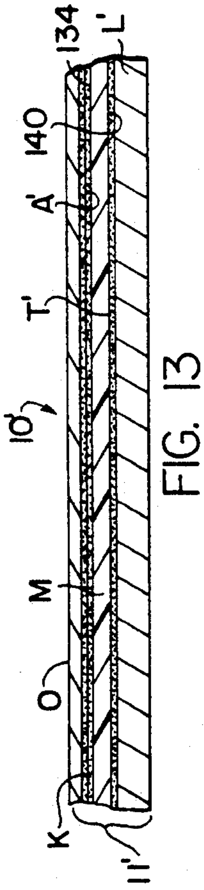
FIG. 13 is a sectional view through the web shown in FIG. 12.

Referring now to FIGS. 12 and 13, and to an alternate embodiment of a web employed by the system embodying the present invention, it should be seen that the web 11' is comprised of a liner or base sheet L' bonded to a modified sheet of sign material M'. The sign material sheet M' has an upper surface 134 and an opposite lower surface 140 defining the good or the sign face of the sheet. Here, the liner sheet L' has a layer of pressure sensitive or permanently tacky adhesive T' bonded more strongly to it than to the sign surface 140 of the sign material sheet M'. Thus, the sign surface 140 serves as a release surface allowing the adhesive layer T' to remain with the liner L' when the sign material sheet M' is pulled from it. Formed on the upper surface 134 of the sign material sheet M' is a layer of dry activatable adhesive K capable of being selectively activated and subsequently bonded with the overlay sheet 10'. The dry activatable adhesive K may take the form of a number of different types of activatable adhesives. Most notably, the layer K is preferably a cured adhesive in which are embedded a plurality of crushable microcapsules of the type C disclosed with reference to FIG. 7 above. The web 11' is preferably of the type disclosed in copending U.S. Ser. No. 056,458, entitled SIGN MAKING WEB WITH DRY ADHESIVE LAYER AND METHOD OF USING THE SAME filed on May 29, 1987 in the name of the same inventor of the present invention and being commonly assigned therewith.

In this embodiment, the graphic 18' is cut into the sign material sheet M' according to steps (100) through (102) discussed above. Since an activatable adhesive layer K is already bonded to the surface 134 of the sign material sheet M', it is therefore not necessary to provide another such adhesive on the sheet O. However, the lower surface 76' of the sheet O has a layer of tacky adhesive A' for maintaining registration of the overlay sheet 10' with the web 11' once the adhesive layer A' is placed down into contact on the dry adhesive surface K. Particularly well adapted for cutting and weeding of the graphic 18' formed in the web 11' is the replaceable tool arrangement of FIGS. 3 and 5. As previously discussed, the graphic 18' is cut in the web 11' by the cutting tool 46, thereafter replaced by the pressing implement 72. With the overlay sheet 10' in place on the web 11', the steps (110), (112) and (116) discussed previously with respect to FIG. 8 are then followed by the controller 7 causing the pressing tool 72 to be moved along the path 19'. This results in the weed portions W of the sign material sheet M' becoming bonded to the overlay sheet O allowing them to be removed in accordance with the above-mentioned manner. Once removed, the sign material defining the cut graphic may then be applied directly to the sign surface using the base sheet L according to the method disclosed in the aforementioned copending U.S. application Ser. No. 056,458.

Figure 14:
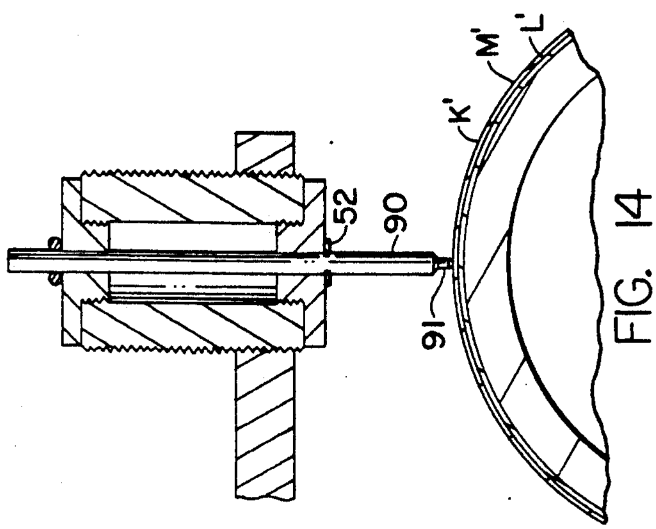
FIG. 14 is a side elevation view partially in section of an alternative embodiment showing a liquid applicator mounted in the support arm in place of the cutting tool of FIG. 3.

The dry activatable adhesive layer may alternatively take the form of an adhesive layer K' capable of being transformed into a tacky state by applying a liquid to it. As shown in FIG. 14, an applicator 90 having a depending tip 91 is filled with a liquid tackifier and replaces the cutting tool 46 for this purpose. While the activatable adhesive layer K' in this embodiment may take the form of a variety of different adhesives, the dry adhesive layer is preferably either rubber based or is water soluble. In the example where the adhesive layer K' is water soluble, the applicator 90 is filled with a water based solution and in the example where the adhesive is rubber based, the applicator may be filled with a chemical tackifier, such as KODAFLEX Tx1B commercially made available by the Eastman Kodak Co., or other suitable activators, such as a di-2-ethyl hexyl phthalate solution.

The applicator 90 when applying the tackifier in the manner shown in FIG. 14 follows the offset path created within the controller 7 as described with reference to step 112 in FIG. 8. In this embodiment, the tip 91 of the applicator 90 directly contacts the adhesive layer K' to activate it along underlying portions thereby forming a path 19' of tacky adhesive adjacent the graphic 18'. With the weed now outlined by the path 19', the overlay sheet O' need only be comprised of a sheet of material, preferably paper, having a sufficient size to be placed over the graphic 18 to bond it with the weed portions of the sign material sheet M' and to consequently allow the overlay sheet O to peel the weed portions from the liner L' when the two sheets are pulled apart. For this, the adhesive layer K' in its tacky condition possesses a greater per unit peel strength taken relative to that of the tacky adhesive layer T' in accordance with the relative strengths set forth in table A-1 above.

In summary, it should be apparent from the foregoing that the automatic weeding system embodying the present invention employs the sign generating machine 12 and associated software for causing the holder 40 and the implement carried by it to be moved relative to the work surface 20 to not only cut a desired graphic into the web 11,11', but also to selectively tackify portions of the bonding means 71 into an activated adhesive. An overlay sheet 10 is provided for cooperating with the tackified portions of the bonding means such that the weed portions of the web 11 become bonded to the overlay sheet 10 for subsequent removal by the user. Depending on the type of activatable adhesive which may comprise the bonding material 71, the overlay sheet 10 is either placed on the web 11 prior to the second pass made by a pressure tool as shown in FIG. 7, or may be placed on the web 11' after the adhesive is activated, such as shown in FIG. 14 wherein the adhesive is liquid activated. Additionally, the holder 40 may either carry two separate tools, one for cutting the web and the other for subsequently activating the bonding means 71 as illustrated in FIGS. 5 and 6, or may carry a single tool which both cuts and activates without requiring tool replacement as is apparent from FIG. 10.

While the present invention has been described in the preferred embodiments, it should be understood that numerous modifications and substitutions can be made without departing from the spirit of the invention. For example, while in the present invention it is disclosed that the overlay sheet 10,10' is used for removing the unwanted portions of the sign material sheet M,M' by pulling material which surrounds the graphic off the liner sheet material, it is possible to alternatively reverse the offset path followed by the pressure foot or tool so that the text adheres to the overlay sheet rather than to the weed portion so that it can be lifted off the backing leaving the weed on the original liner. Furthermore, while in the preferred embodiment of the present invention, the microencapsulated adhesive C is disclosed as being the preferred bonding means, it is entirely within the scope of the invention to substitute other known adhesives for this, such as for example, a thermally activated adhesive activated to a tacky condition by a heating element carried by the tool holder 40. Additionally, the tool 72 may alternatively be an ultrasonic device moved along the overlay sheet in place on the sign material sheet to weld the two sheets together along a path.

Accordingly, the present invention has been described by way of illustration rather than limitation.

I claim:

1. A system for automatically weeding about a graphic cut in a sheet of sign material having an upper surface and a lower surface releasably adhesively attached to an underlying base layer sheet, said system comprising:

a support;

a work surface provided on said support;

an overlay sheet having an upper surface and an opposite lower surface facing said sign material sheet;

sheet material feeding means cooperating with said work surface for feeding sheet material comprising a base layer sheet, said sign material sheet and an overlay sheet across said work surface in a direction parallel to its length, said sheet material including a bonding material interposed between said sign material sheet and said overlay sheet for selectively bonding portions of said cut sign material sheet with said overlay sheet and said bonding material having sufficient bonding strength to pull the cut graphic from the underlying base layer sheet;

tool means movable relative to said work surface for cooperating with said sheet material to cause bonding of said overlay sheet with portions of said sign material sheet in response to movements of said tool means over the sheet material with the bonding material interposed between said sign material sheet and said overlay sheet and;

control means connected with said sheet material feeding means and said tool means for coordinating movement between said tool means and said sheet material feeding means to cause the tool means to follow an offset path along the graphic cut in the sign material sheet resulting in the selective bonding of the overlay sheet with the sign material sheet along said portions corresponding to the path followed by said tool means over said cover sheet.

2. A system as defined in claim 1 further characterized in that said bonding material is interposed between said overlay sheet and said sign material sheet and includes microencapsulated adhesive activated by said tool means by downwardly applied force.

3. A system as defining claim 2 further characterized in that said bonding material is attached to said lower surface of said overlay sheet by a layer of permanently tacky low tack adhesive having a per unit bonding strength less than that of said bonding material;

said overlay sheet being releasably attached to said sign material sheet by the said layer of permanently tacky low tack adhesive to maintain said overlay sheet in registration with said sign material sheet when said tool means applies said downward force; and wherein said microcapsules are embedded within said permanently tacky low tack adhesive layer.

4. A system as defining claim 3 further characterized in that said tool means includes a tool holder capable of traveling across said work surface relative to the direction of flow of said sign material sheet material; and said tool holder carrying a pressure tool having a depending portion defining a pressure tip for engaging with and applying a downward force onto said overlay sheet thereby activating said activatable adhesive along said path offset from the graphic cut in said sign material sheet.

5. A system as defined in claim 4 further characterized in that said sheet material feeding means includes holding means for maintaining said cut sheet of sign material and its underlying base layer sheet within said sheet material feeding means; and said cover sheet having a width less than each of said sign material sheet and said base layer sheet such that when releasably attached to said sign material sheet by said layer of permanently tacky low tack adhesive, said overlay sheet is in registration with said sign material sheet for unitary movement across said work surface without interfering with said holding means of said sheet material feeding means.

6. A system as defined in claim 4 further characterized in that said work holder includes a chuck having clamping means for substituting said pressing tool for a cutter knife used to cut said graphic in said sign material sheet; and wherein said tool holder is pivotally mounted relative to said support and has adjustment means for adjusting the amount of downward force applied by the pressing tool.

7. A system as defined in claim 5 further characterized in that said sign material sheet and said base layer sheet includes a first and second series of openings with said openings of said first series being located along one longitudinal edge of said overlay sheet and said base layer sheet and said second series being located along the other opposite edge of each sheet;

each of said openings in said first series being tranversely aligned with a corresponding opening in said second series; and wherein said sheet material feeding means includes two spaced apart sprockets rotatable about a common axis of rotation and each having a plurality of radially extending and circumferentially spaced apart pins identically arranged about each sprocket respectively receiving in registry therewith corresponding pairs of openings of said first and second series.

8. A system as defined in claim 5 further characterized in that said pressure tool is a pressure foot carried by said tool holder as part of a tool assembly;

said tool assembly having a cutting blade located adjacent said pressure foot and being offset laterally relative thereto;

said cutting blade having a tip depending from said pressure foot a first given distance;

said overlay sheet having a thickness measured between said upper and lower surfaces being greater than said first given distance such that said tip does not penetrate through said overlay sheet when the pressure foot is moved along the upper surface of said overlay sheet.

9. A system as defined in claim 8 further characterized in that said control means has means for causing said tool assembly to be moved along the upper surface of said overlay sheet in a counterclockwise direction when the tool assembly follows the outer limits of the graphic cut in said sign material sheet to orient the pressing tool outwardly offset relative to the graphic outer limits;

said means further causing said tool assembly to be moved along the upper surface of said overlay sheet in a clockwise direction when the tool assembly follows inner limits of the graphic cut into said sign material sheet to orient the pressing tool inwardly offset relative to the any inner limit which may define the graphic.

10. A system as defined in claim 2 further characterized in that the bonding material is formed on the upper surface of said cut sheet of sign material.

11. A system as defined in claim 10 further characterized in that said bonding material is microencapsulated adhesive embedded within a layer of dry adhesive formed on the upper surface of the sign material sheet.

12. A system as defined in claim 11 further characterized in that said tool means includes a tool holder capable of moving relative to said work surface;

said tool holder further including a pressure tool having a depending portion defining a pressure tip engagable with the upper surface of the overlay sheet for applying a downward force on said overlay sheet and subsequently activating said bonding material disposed below it.

13. A system as defined in claim 12 further characterized in that said control means includes means for causing said pressure tip to follow a path along the upper surface of said overlay sheet outwardly offset from the outer limits of the graphic and inwardly offset from any inner limit which may define an opening in the graphic.

14. A system as defined in claim 13 further characterized in that said sheet of sign material is releasably attached to the underlying base layer sheet material by a permanently tacky adhesive bonded to the base layer sheet;

said permanently tacky adhesive having a per unit bonding strength less than that of said bonding material when activated; and said sign material sheet lower surface defining said sign surface and facing said base layer sheet and being in confrontation with said layer of permanently tacky adhesive.

15. A system for automatically weeding about a graphic cut in a sheet of sign material; having an upper surface and a lower surface releasably adhesively attached to an underlying base layer sheet, said system comprising:

a support;

a work surface provided on said support;

means cooperating with said work surface for feeding said base layer and said sign material sheet across said work surface in a direction parallel to the length of each of said base layer and sign material sheets;

an overlay sheet having an upper surface and an opposite lower surface facing said sign material sheet;

tool means movable relative to said work surface for cooperating with bonding means formed on said upper surface of said sign material sheet to activate portions thereof underlying said tool means to cause bonding of said cover sheet with said sign material sheet along portions underlying said tool means in response to movements of said tool means over said bonding material and in response to said overlay sheet being subsequently placed in contact with said bonding material after said portions of said bonding material have been activated; and control means connected with said sheet material feeding means and with said tool means for coordinating movement between said tool means and said sheet material feeding means to cause the tool means to follow an offset path along the graphic cut in the sign material sheet resulting in said bonding material selectively bonding said overlay sheet with said sign material sheet along said portions underlying the path followed by said tool means above said sign material sheet.

16. A system as defined in claim 15 further characterized in that said bonding material is formed on said upper surface of said sign material sheet and is comprised of a dry adhesive layer capable of being activated into a tacky condition by a liquid;

said sign material sheet being releasably attached to the underlying base layer sheet material by a permanently tacky layer of adhesive bonded more strongly to said base layer sheet than to the lower surface of said sign material sheet;

said permanently tacky adhesive having a per unit bonding strength less than that of said bonding material when activated;

said tool means including a tool holder capable of traveling across said work surface transversely to the direction of flow of said sign material sheet material; and said tool holder further carrying a liquid applicator having a depending tip engagable with said dry adhesive layer for selectively applying a liquid activator to said dry adhesive layer.

17. A system as defined in claim 15 further characterized in that said control means includes means for causing said depending tip of said applicator to follow a path along the dry adhesive layer outwardly offset from the outer limits of the graphic and inwardly offset from any inner limit which may define an opening in the graphic.

18. A system as defined in claim 15 further characterized in that said liquid activator is a water solution and said dry adhesive layer is water soluble.

19. A system as defined in claim 15 further characterized in that said liquid activator is a chemical tackifier and said dry adhesive layer is rubber based.

* * * * *